Aug. 18, 1970 T. R. SMITH 3,524,596
WASTE DISPOSER SPLASH SHIELD
Filed Oct. 23, 1968

INVENTOR.
THOMAS R. SMITH
BY
William R. Landwier
AGENT

United States Patent Office 3,524,596
Patented Aug. 18, 1970

3,524,596
WASTE DISPOSER SPLASH SHIELD
Thomas R. Smith, Newton, Iowa, assignor to The Maytag Company, Newton, Iowa, a corporation of Delaware
Filed Oct. 23, 1968, Ser. No. 769,920
Int. Cl. B02c 23/00
U.S. Cl. 241—100.5     8 Claims

ABSTRACT OF THE DISCLOSURE

The disclosed waste disposer splash shield includes a plurality of inwardly and downwardly extending segmental members. Alternately positioned segmental members have a top surface substantially aligned with the bottom surface of the interposed segmental members so that adjacently positioned segmental members have substantially line-to-line contact along the radially extending boundaries.

BACKGROUND OF THE INVENTION

Field of the invention

This invention relates to a waste disposer and more particularly to a splash shield positioned in the inlet of the disposer.

Description of the prior art

It is well known in the waste disposer art to provide a splash shield in the inlet of the waste disposer apparatus to prevent the partially ground waste material and flushing water from splashing upwardly through the inlet. Numerous attempts have been made at providing a resilient disclike splash shield having movable segments by forming spaced-apart members or by forming a diaphragm and then slitting the diaphragm to form a plurality of closely positioned members. The spaced-apart members, however, cannot fully prevent the upward splashing. On the other hand, the fabrication costs and problems of a splash shield including radial slits to form closely positioned fingers are excessive.

Another construction shows a plurality of vertically and circumferentially offset fingers that extend inwardly from an annular portion to provide an open free flow passage through the inlet. This construction, however, also includes fabrication problems and does not provide a separation of the grinding chamber and the area outside the disposer apparatus adjacent the inlet.

SUMMARY OF THE INVENTION

It is an object of the instant invention to provide an improved waste disposer splash shield including offset members having substantially line-to-line contact.

It is a further object of the instant invention to provide an improved waste disposer splash shield having inwardly extending segmental members of which alternate ones are vertically offset so that the upper surface of one segmental member is substantially aligned with the lower surface of the adjacent segmental member.

It is a further object of the instant invention to provide a waste disposer splash shield having vertically offset flexible members to facilitate economical fabrication while maintaining a cooperative relationship to secure effective closing of the waste disposer inlet.

It is a still further object of the instant invention to provide a waste disposer splash shield having inwardly extending members and constructed in such a manner to substantially eliminate spaces between the inwardly extending members while also eliminating a manufacturing problem namely the slitting normally associated with the provision for inwardly extending members.

The instant invention achieves these objects in a waste disposer splash shield comprising an outer annular portion and a plurality of inwardly extending resilient members that are vertically offset from adjacent members to position the top surface of one member substantially aligned with the bottom surface of the adjacent member so that there is substantially line-to-line contact between the adjacent resilient members.

Operation of the splash shield and further objects and advantages thereof will become evident as the description proceeds and from an examination of the accompanying page of drawings which illustrate a preferred embodiment of the invention and in which similar numerals refer to similar parts throughout the several views.

DESCRIPTION OF THE PEFERRED EMBODIMENT

Figure 1:
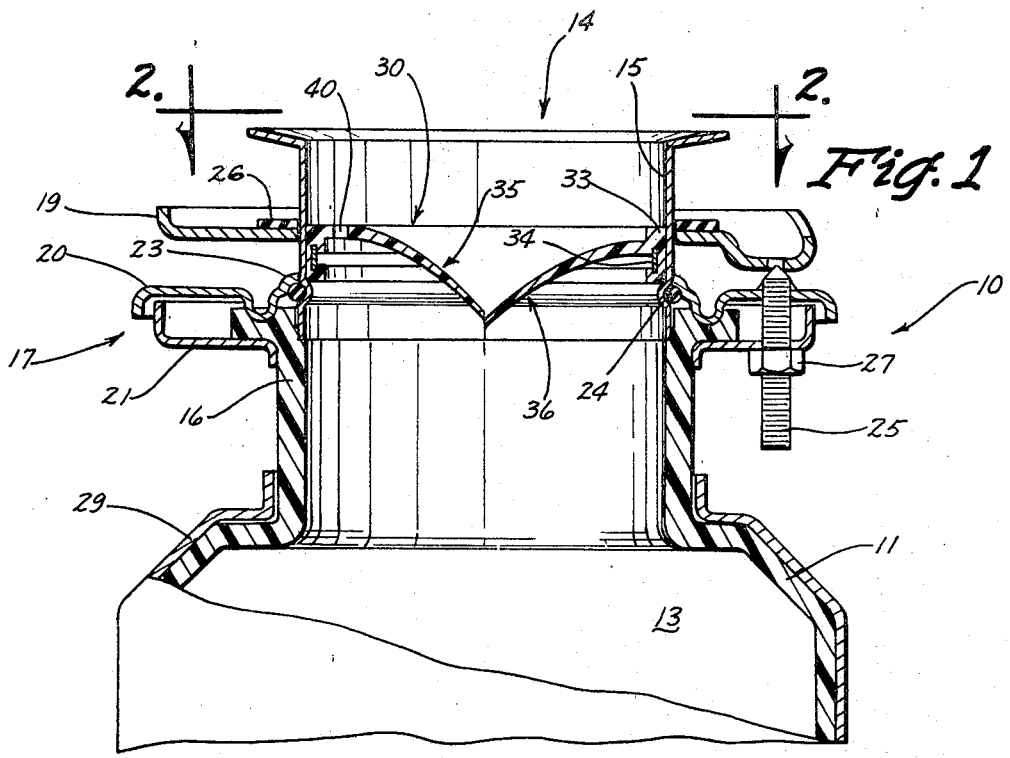
FIG. 1 is a fragmentary sectional view of a waste disposer apparatus showing the upper portion thereof in a vertical section as taken substantially along line 1—1 of FIG. 2.

Referring to FIG. 1, there is shown a waste disposer apparatus 10 including an upper housing 11 defining a comminution chamber 13 for accommodating waste material to be comminuted and further including an inlet 14 at its upper end for receiving waste material and flushing liquids. The inlet 14 is defined at least in part by a generally cylindrical flanged inlet sleeve member 15 supportable in a drain opening of a sink (not shown) or the like. The inlet sleeve 15 is connected to the flanged inlet end 16 of the upper housing 11 through a supporting arrangement, indicated generally by an arrow 17, and which includes upper and lower mounting plates 19 and 20 and a flange clamping plate 21.

The inner flange portion 23 of the lower mounting plate 20 is supported on a retaining ring 24 carried by an inwardly extending recess formed in the flanged inlet sleeve 15. A plurality of mounting studs 25 are threadingly engageable with the lower mounting plate 20 and extend upwardly therethrough to bear against the upper plate 19 which in turn bears against the lower side of a supporting sink flange (not shown) through a resilient sink gasket 26. The mounting studs 25 carrying a clamping nut 27 engageable with the lower surface of the flange clamping plate 21. Tightening of the clamping nuts 27 on the mounting studs 25 clamp the flanged inlet end 16 of the upper housing 11 between the lower mounting plate 20 and the flange clamping plate 21. Tightening of the studs 25 separates the upper mounting plate 19 from the lower mounting plate 20 to effect a connection of the disposer 10 to the sink through the flanged inlet sleeve 15 and retaining ring 24. The upper housing 11 is connected to the lower portion of the waste disposer apparatus (not shown) through the housing clamp 29.

Though not shown, the disposer apparatus 10 includes means for comminuting the waste material and for discharging the comminuted waste material and flushing fluid to an appropriate drain.

Disposed within the inlet 14 and engageable with the cylindrical inlet sleeve 15 is a splash shield for substantially closing the inlet 14 under normal conditions and forming the subject matter of the instant invention. A splash shield is considered necessary in this type of a continuous feed waste disposer apparatus to prevent the upward splashing of waste materials and flushing water while permitting feeding of waste material and flushing water into the comminuting chamber.

The splash shield 30 of the instant embodiment is molded of a resilient deformable material such as ethylene propylene terpolymer. The splash shield 30 includes an outer annular portion 33 engageable with the inner wall of the inlet sleeve 15 and defining an inwardly facing annular groove for receiving a flexible resilient retaining ring 34. The retaining ring 34 is operable for removably securing the splash shield 30 within the inlet sleeve 15.

Figure 2:
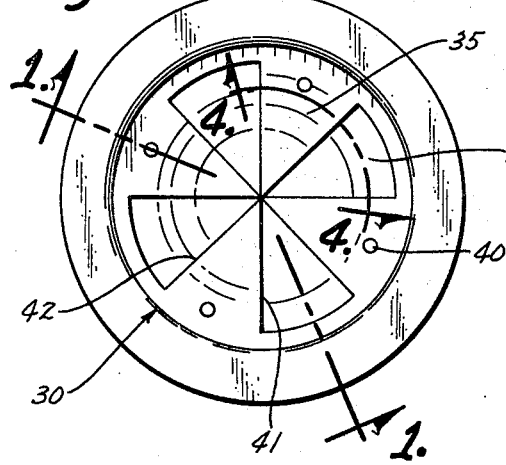
FIG. 2 is a top plan view of the waste disposer shown in FIG. 1 and taken substantially along line 2—2 of FIG. 1.
Figure 3:
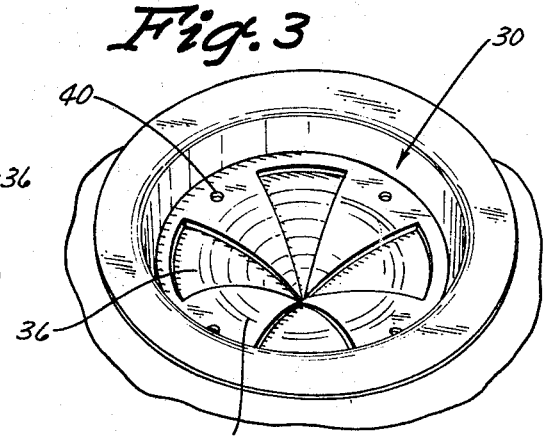
FIG. 3 is a perspective view of the inlet portion of the waste disposer showing subject matter of the instant invention.

The splash shield 30 further includes a plurality of inwardly and downwardly extending segmental members or fingers 35 and 36 that are attached to the outer annular portion 33 and extend inwardly to the central axis of the inlet sleeve 15 and waste disposer 10 as best shown in FIGS. 2 and 3. The segmental members 35, 36 are movable as individually deformable fingers but are disposed adjacent one another so as to substantially close the inlet 14 in their normal position. The segmental members 35, 36 are easily deformable to allow the insertion of waste material and are also deformable under the pressure of flowing water to permit the entry of flushing water into the waste disposer 10 during the comminution operation. Their cooperative relationship, however, substantially eliminates the possibility of waste material particles or flushing fluid being rejected from the comminution chamber 13 through the inlet 14. Furthermore, the downwardly extending feature of the segmental members 35, 36 places the segmental members 35, 36 in a condition of cooperative interference to prevent the movement of the fingers upwardly responsive to impingement of waste particles thrown upwardly from the comminution chamber 13.

Figure 4:
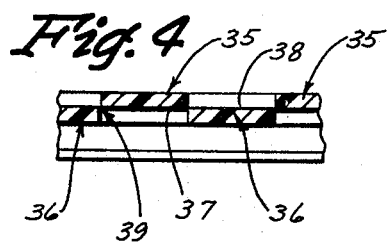
FIG. 4 is a fragmentary sectional view taken substantially along arcuate section line 4—4 in FIG. 2.

As best shown in FIGS. 3 and 4, the segmental members 35 are vertically offset above the segmental members 36 to position the lower surface 37 of the uppermost segments 35 substantially aligned with the upper surface 38 of the lowermost segments 36 so that a line-to-line contact 39 between adjacent segmental members is achieved. This offset arrangement of the segments 35, 36 and the resulting line-to-line contact is best shown in FIG. 4 wherein the segmental members 35, 36 are shown in section along arcuate section line 4—4 as indicated in FIG. 2. This line-to-line contact 39 between the adjacent segmental members 35, 36 offers distinct advantages in fabrication and in operation.

Referring again to FIG. 1, it is shown that the segmental members 35, 36 have a thickness tapering from a relatively heavy section at the point of juncture with the annular portion 33 to a relatively thinner section near the center of the splash shield 30. This tapering thickness is advantageous in providing the desirable flexibility characteristics necessary for admitting waste material and flushing fluid while preventing the upward flow of particles and fluid from the comminution chamber 13.

There is also shown in the drawings a plurality of holes 40 defined by the splash shield 30 adjacent the annular portion 33 for venting the comminution chamber 13 to the atmosphere. This venting is necessitated by the efficient closing of the inlet 14 by the segmental members 35, 36.

As previously indicated, the line-to-line contact 39 between adjacent segmental members 35, 36 offers distinct advantages in the fabrication of the splash shield 30. Substantially line-to-line contact of mating die parts would permit the molding of such a part with a minimum of flash connecting the segmental members. It is also possible to mold the splash shield 30 so that the segmental members are intentionally connected along their two sides 41, 42 to the adjacent segmental members at the point of line-to-line contact. After the molding operation, a simple piercing of the splash shield with a relatively large blunt object or sufficiently deforming the splash shield in some other way is all that is necessary to break or shear the material at the point of juncture 39 between the adjacent segmental members to form a plurality of individually movable segmental members having line-to-line contact along the previously connected joint. This method of fabrication eliminates the need for an expensive slitting operation as in other methods of forming a splash shield where contact is attempted to be maintained between the individual inwardly extending fingers.

Furthermore, this offset arrangement of the individual segmental members 35, 36 permits each of the members to act more independently of the adjacent members. Previously, installation deformations of the splash shield frequently caused interference between adjacent members. In this construction, the offset feature allows the segmental members 35, 36 to overlap the adjacent members and present a neater visual appearance.

This method of forming and the ease with which the segmental members 35, 36 may be separated provide an additional feature useful in a waste disposer apparatus. This feature concerns molding of the splash shield with the segmental members 35, 36 connected and the leaving of the members connected until the waste disposer is installed in the sink ready for operation. Such a construction prevents entry of foreign articles into the comminution chamber during the installation process. After installation, the installer or the operator then may pierce the inlet manually to separate the segmental members 35, 36 into individual members.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention as further defined in the following claims.

I claim:

1. For a waste disposer apparatus including a sink mounting sleeve defining an inlet opening into said waste disposer apparatus for receiving waste and flushing water, a splash shield comprising: an outer annular means engageable with said sink mounting sleeve to position said splash shield in said inlet opening; and a plurality of resilient members connected to and extending inwardly from said annular means for normally substantially closing said inlet opening, each of said inwardly extending resilient members having an upper surface and a lower surface and being vertically offset to position the upper surface of one inwardly extending resilient member substantially aligned with the lower surface of the adjacent inwardly extending resilient member.

2. A splash shield for a waste disposer apparatus as defined in claim 1 wherein said resilient members extend inwardly and downwardly from said outer annular means.

3. A splash shield for a waste disposer apparatus as defined in claim 1 and further including a flexible retaining ring cooperable with said outer annular means for retaining said splash shield in said inlet opening.

4. A splash shield for a waste disposer apparatus as defined in claim 1 wherein said inwardly extending resilient members have a decreasing thickness in the inwardly extending direction whereby the inwardly extending resilient members have an increasing flexibility toward the central porion of the splash shield.

5. For a waste disposer apparatus including a sink mounting sleeve defining an inlet opening into said waste disposer apparatus for receiving waste and flushing water, a splash shield comprising: an outer annular means engageable with said sink mounting sleeve to position said splash shield in said inlet opening; and a plurality of resilient segmental members connected to and extending inwardly from said outer annular means, each of said segmental members having an upper surface and a lower surface with a portion of said segmental members being vertically offset to position the upper surface of one segmental member substantially aligned with the lower surface of the adjacent segmental member, each of said segmental members having an edge substantially aligned with an edge of the adjacent segmental member whereby the adjacently positioned segmental members have substantially line-to-line contact.

6. A splash shield for a waste disposer apparatus as defined in claim 5 wherein said segmental members are joined along the line-to-line contact between adjacent segmental members.

7. A splash shield for a waste disposer apparatus as defined in claim 5 wherein said segmental members extend inwardly toward the axis of said disposer apparatus for normally substantially closing said inlet opening and preventing upward splashing of water and waste materials from said waste disposer apparatus.

8. A splash shield for a waste disposer apparatus as defined in claim 7 wherein a portion of said splash shield defines an opening for venting the interior of said waste disposer apparatus to the atmosphere through the splash shield.

References Cited
UNITED STATES PATENTS 2,980,351   4/1961   Greene _____ 241—100.5

ROBERT C. RIORDON, Primary Examiner

M. G. RASKIN, Assistant Examiner